(12) United States Patent
Pendse et al.

(10) Patent No.: US 11,586,690 B2
(45) Date of Patent: Feb. 21, 2023

(54) CLIENT-SIDE PERSONALIZATION OF SEARCH RESULTS

(71) Applicant: Apple Inc., Cupertino, CA (US)

(72) Inventors: Saurabh V. Pendse, San Jose, CA (US); Giacomo Saccardo, Santa Clara, CA (US); Jason Dizon, Cupertino, CA (US); Bernard K. Huang, San Jose, WA (US); Manmeet Singh, Sunnyvale, CA (US); Sayantini Nag, Mountain View, CA (US); Usama M. Hajj, London (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/782,950

(22) Filed: Feb. 5, 2020

(65) Prior Publication Data

US 2021/0240786 A1 Aug. 5, 2021

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/9035* (2019.01); *G06F 16/90348* (2019.01); *G06F 16/954* (2019.01)

(58) Field of Classification Search
CPC ............. G06F 16/9537; G06F 16/9535; G06F 16/164; G06F 16/2379; G06F 16/245; G06F 16/337; G06F 16/9024; G06F 16/9536; G06F 16/29; G06F 2209/463; G06F 3/00; G06F 9/46; G06F 9/465; G06F 9/541; G06F 1/1613; G06F 1/1616; G06F 1/1622; G06F 1/1624; G06F 1/1626; G06F 1/1632; G06F 1/1664; G06F 1/1698; G06F 16/148; G06F 16/243; G06F 16/24578; G06F 16/288; G06F 16/3334; G06F 16/335;
(Continued)

(56) References Cited

U.S. PATENT DOCUMENTS 9,070,088 B1 * 6/2015 Baveja .................. G06N 20/00
2009/0254971 A1 * 10/2009 Herz .................. G06Q 30/0603
726/1

(Continued)

*Primary Examiner* — Shyue Jiunn Hwa
(74) *Attorney, Agent, or Firm* — Invoke

(57) ABSTRACT

In some implementations, a user device (e.g., a computing device) can perform client-side personalization of search results. For example, a computing device can obtain search results matching user specified search parameters from a server device and/or from various services on the user device. The user device can score the search results based on various search result item attributes. After scoring, the user device can promote or demote search results items based on whether the search results item is relevant to recent user behavior. The promotion and/or demotion of search results items can cause search results items scores to be adjusted to generate a personalized score for each search result. The search results can then be ordered and/or presented based on the personalized score for each search results item. When presenting search results items, the user device can present information indicative of the source of the search results items.

21 Claims, 8 Drawing Sheets

(51) Int. Cl.
*G06F 16/903* (2019.01)
*G06F 16/954* (2019.01)
*G06F 16/9035* (2019.01)

(58) Field of Classification Search
CPC .... G06F 16/738; G06F 16/7867; G06F 21/10; G06F 2221/0768; G06F 16/958; G06F 16/00; G06F 2209/545; G06F 8/70; G06F 9/445; G06F 9/451
See application file for complete search history.

(56) References Cited

U.S. PATENT DOCUMENTS

| | | |
|---|---|---|
| 2010/0198854 A1 | 8/2010 | Chitturi et al. |
| 2011/0040604 A1 | 2/2011 | Kaib et al. |
| 2014/0304247 A1 | 10/2014 | Fastlicht |
| 2016/0041998 A1* | 2/2016 | Hall ................... G06F 16/7867 707/725 |
| 2016/0078358 A1* | 3/2016 | Baveja ................... G06N 5/048 706/52 |
| 2018/0349499 A1* | 12/2018 | Pawar ............... G06F 16/24578 |
| 2020/0193056 A1 | 6/2020 | Hughes et al. |
| 2021/0133862 A1* | 5/2021 | Singh ................... G06F 3/0482 |

* cited by examiner

CLIENT-SIDE PERSONALIZATION OF SEARCH RESULTS

TECHNICAL FIELD

The disclosure generally relates to personalization of search results received by a user device.

BACKGROUND

Computing devices provide mechanisms for a user to search for various types of information. In particular, a user can provide input (e.g., typed textual characters, voice input, etc.) specifying search parameters for initiating a search for locations matching the search parameters (e.g., a sequence of characters). The search parameters can be sent to a server device. The server device can perform a search for locations that match the search parameters and return the search results to the client device for presentation to the user. However, aside from matching the search parameters, the search results returned to the user may not be personalized to the user. Or, if the search results are personalized by the server, the client device may need to send personal user information to the server device and risk exposing the user's private information.

SUMMARY

In some implementations, a user device (e.g., a computing device) can perform client-side personalization of search results. For example, a computing device can obtain search results matching user specified search parameters from a server device and/or from various services on the user device. The user device can score the search results based on various search result item attributes. After scoring, the user device can promote or demote search results items based on whether the search results item is relevant to recent user behavior. The promotion and/or demotion of search results items can cause search results items scores to be adjusted to generate a personalized score for each search result. The search results can then be ordered and/or presented based on the personalized score for each search results item. When presenting search results items, the user device can present information indicative of the source of the search results items.

Particular implementations provide at least the following advantages. Client-side personalization of search results can enhance user privacy by avoiding transmission of sensitive, private, personal information through a network to a server device. Personalization of search results by promoting and/or demoting search results items based on recent user behavior enhances the user experience by presenting the search results items that are most relevant to recent user behavior and/or current user context (e.g., current location) in a way that allows the user to quickly view and access the search results items that are most relevant to the user. Presenting information identifying the source of the search results item allows the user to quickly identify and/or understand why specific search results items are being presented.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
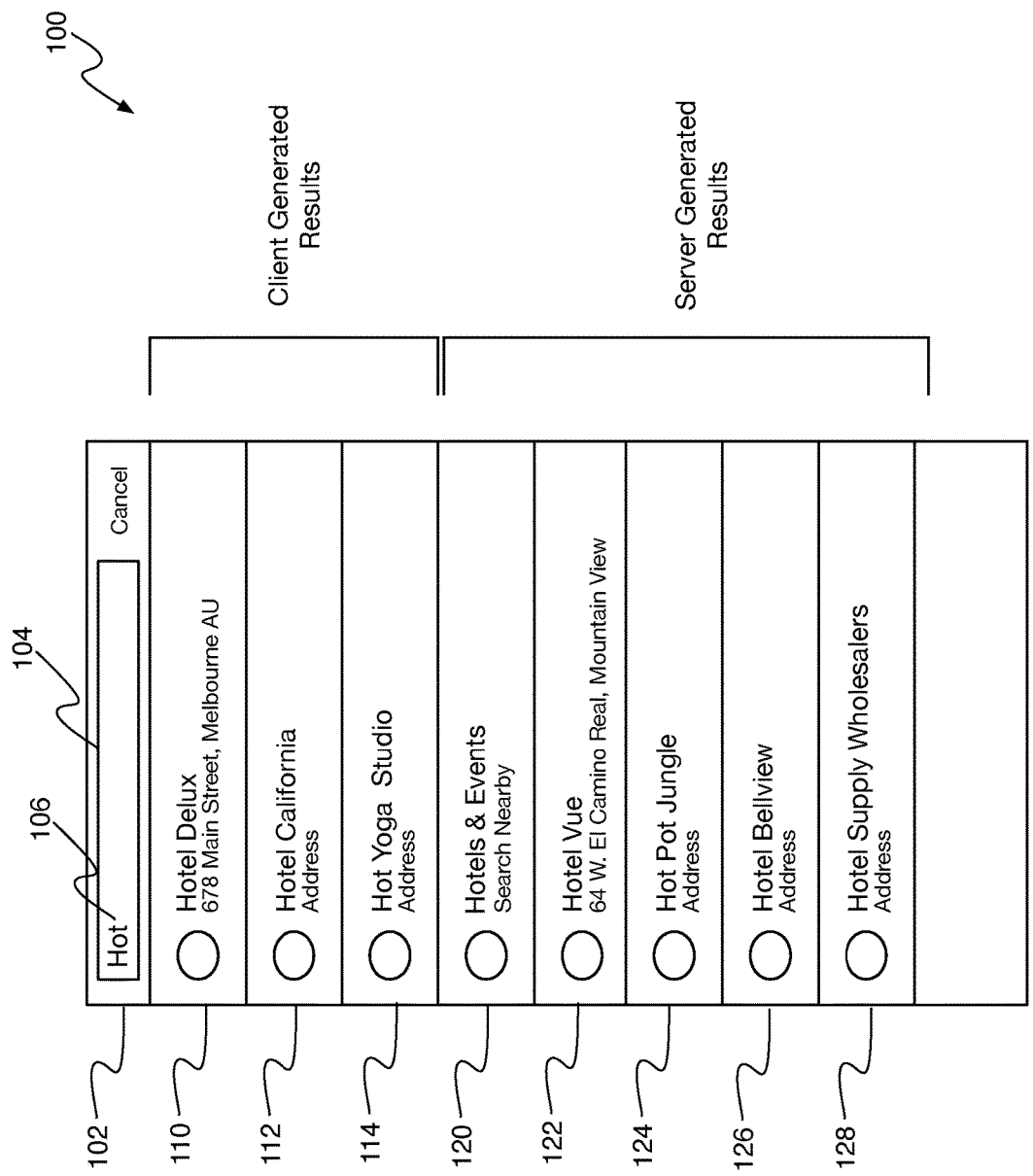
FIG. 1 is an example graphical user interface for presenting combined client generated search results and server generated search results.

FIG. 1 is an example graphical user interface 100 for presenting combined client generated search results and server generated search results. For example, graphical user interface (GUI) 100 may be generated by a user device to present search results on a display of the user device. An implementation for presenting the combined client and server search results may simply present the client generated search results items (e.g., items obtained from sources on the user device) at the most visible and/or readily accessible locations (e.g., at the top of the search results listing) on GUI 100 followed by the server generated search results items. This strategy assumes that the search results items (e.g., search results items 110-114) obtained from sources on the user device (e.g., client device) are more relevant to the user than the server search results items (e.g., 120-128) obtained from a remote server, which may not always be the case.

In some implementations, GUI 100 can include search bar 102. For example, search bar 102 may be presented at the top of GUI 100. Search bar 102 may include text input box 104 for receiving user input specifying search parameters (e.g., a string of characters) for performing a search. In the examples provided herein, the user may be searching for a location that matches the input string. However, the implementations described herein could be applied to other types of searches as well, such as searches for people or other objects or information. The text input received by text input box 102 can be provided by user input to a keyboard specifying specific characters in the string of characters. The text input received by text input box 102 can be provided by user voice input that is converted into text received by the text input box 104. In the example of GUI 100, the user has provided input specifying the string 106 (e.g., "Hot") as the search string. The user device has obtained search result items (e.g., locations matching the search input string) from client-side sources on the user device (e.g., search results items 110-114) and from a remote server (e.g., search results items 120-128) and presented them on GUI 100. For example, the user device has presented the client side results at the most prominent position on GUI 100 followed by the server generated results.

While the approach to presenting the combined client side and server generated search results described above may provide the user with relevant search results at the top of the search results listing, this approach may not always provide the most relevant results at the top of the search results listing. For example, the client-side results may be obtained from a collection of recently searched and/or recently visited locations. For example, the user may have recently visited Melbourne, Australia. However, the user may have now returned home to San Jose, Calif. When the user device obtains the client-side (e.g., client generated) search results from the recently visited locations, the client-side search results may include the Australian hotel "Hotel Delux" as a match for the search string "Hot" and present the hotel at the top of the search results listing as search results item 110. While the Australian hotel may be a valid search results item that matches the search string "Hot", search results item 110 may not be the most relevant search result item since the user has not returned home to San Jose, Calif. In fact, the server generated search result item 122 (e.g., "Hotel Vue" in Mountain View, Calif.) may be a more relevant search result item for the user since it is closer to the user's current location. Thus, the following implementations provide mechanisms for ordering search results items based on the context (e.g., location) of the user device and for promoting and/or demoting search results items based on relevance to the user, as indicated by the user's recent behavior and/or computing activities.

Figure 2:
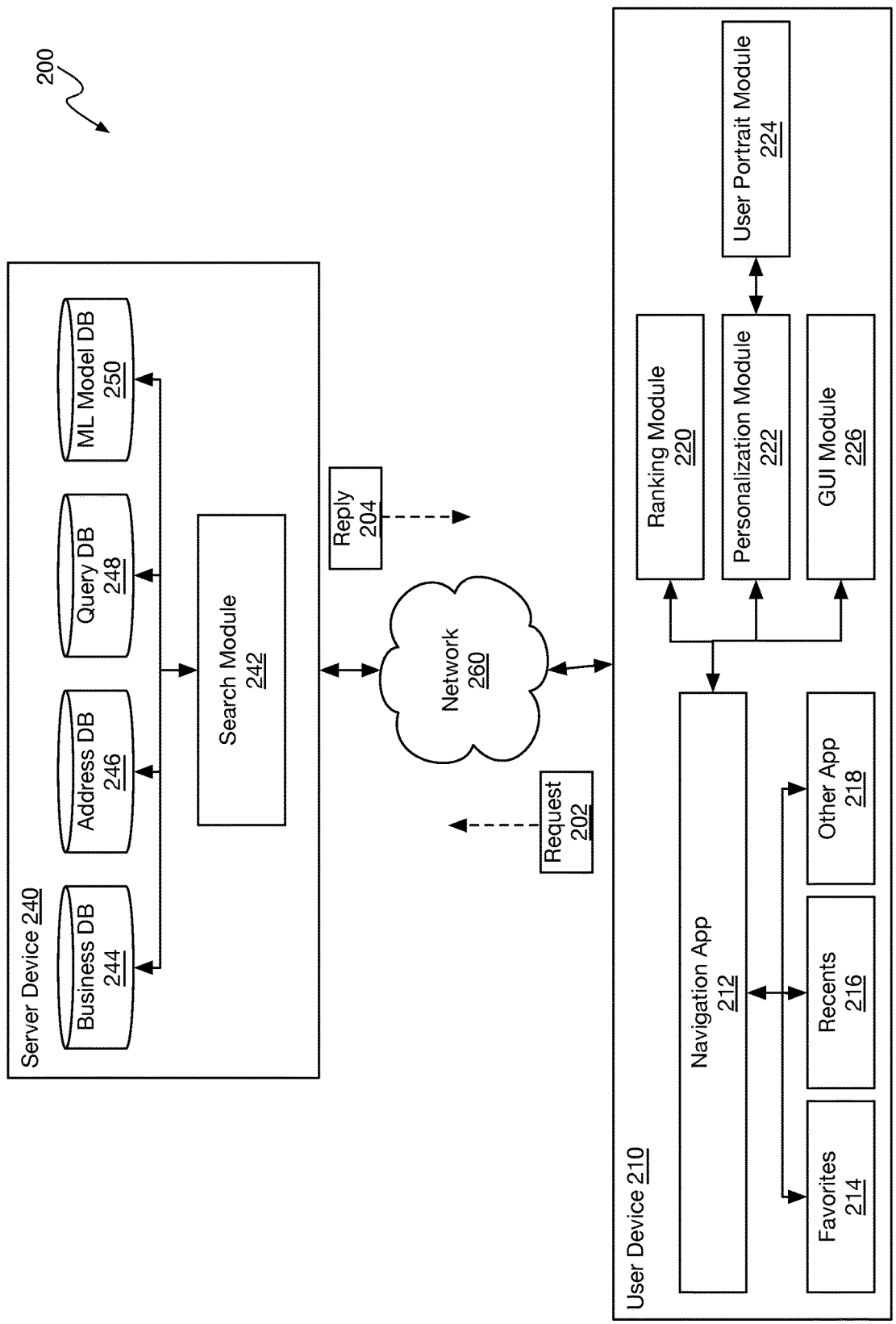
FIG. 2 is a block diagram of an example system for client-side personalization of search results.

FIG. 2 is a block diagram of an example system 200 for client-side personalization of search results. For example, system 200 can be configured to combine client generated search results (e.g., search results obtained from local, client-side sources) and server generated search results (e.g., search results obtained from a remote server device) in a way that presents the search results that are most relevant to the user in the most easily viewed and accessible locations within a search results presentation (e.g., search results listing). System 200 can be configured to promote the search results items that are most relevant to the user and/or demote search results items that are not relevant based on user behavior data collected by user device 210.

While FIG. 2 shows specific modules, databases, and/or other processing components associated with specific computing devices (e.g., server device 240, user device 210), the modules, databases, and/or processing components may be configured across multiple, different computing devices. For example, the databases illustrated within server device 240 may be distributed across multiple different server devices 240 and/or may be configured on server devices that are different than the server device that hosts search module 242. Moreover, the functionality attributed to each module may be combined into fewer modules or divided amongst a greater number of modules while still remaining within the contemplated scope of this disclosure.

In some implementations, system 200 can include user device 210. For example, user device 210 can be a computing device, such as a laptop computer, smartphone, tablet computer, smartwatch, a wearable device, a mobile device, etc. User device 210 can include a navigation application 212. For example, navigation application 212 can be configured to present a location search graphical user interface (e.g., similar to GUI 100) for receiving user input specifying search parameters (e.g., a character string). After receiving the search parameters, navigation application 212 can obtain search results from local sources on user device 210 and/or from server device 240.

In some implementations, navigation application 212 can obtain search results items matching the user input string from local sources on user device 210. For example, the local sources can include favorites collection 214. For example, favorites collection 214 can include location items that the user has previously saved or identified as favorite locations of the user. Favorites collection 214 can be a generic collection of saved favorites. Favorites collection 214 can include multiple collections corresponding to various categories (e.g., favorite restaurants, favorite beaches, favorite bars, favorite parks, etc.).

The local sources can include recents collection 216. For example, recents collection 216 can include locations that the user has recently searched for (e.g., through navigation application 212, a browser application, or other application). Recents collection 216 can include locations that the user has recently visited. For example, recently visited locations can correspond to destinations to which navigation application 212 has provided instructions. Recently visited locations can correspond to destinations to which user device 210 has travelled without navigational aid from user device 210, as detected or determined by the location services running on user device 210. Thus, recents collection 216 can be automatically generated by user device 210 by monitoring user activities involving user device 210.

The local sources can include locations identified in or by other applications 218 on user device 210. The other applications can, for example, include a calendar application, a business review application, a restaurant reservation application, a contacts application, an electronic messaging application, a photos application (e.g., which may provide locations for captured images), or any other application on user device 210 that uses, transmits, stores, or presents location data. The location data for these other applications 218 can include, for example, the location associated things in which the user is interested as indicated by locations associated with calendar events, the location associated with a business that the user has reviewed or searched for, or the location of a restaurant associated with a reservation that the user has made.

Navigation application 212 can combine the matching locations (e.g., records) obtained from favorites collection 214, recents collection 216, and other applications 218 to generate the client-side search result items. For example, the client-side search results can include search results items corresponding to the matching favorite locations, recent locations, and/or locations provided by other applications, and attribute data for each of the search results items, as described further below.

In some implementations, navigation application 212 can obtain search results items matching the user input string from remote sources such as server device 240. For example, server device 240 can provide a location search service accessible to user device 210 through network 260. Network 260 can correspond to a local area network, wide area network, cellular data network, wireless network, the Internet, or any other network configuration.

In some implementations, navigation application 212 can send a location search request 202 to server device 240 to initiate a location search by server device 240. Request 202 can include search request parameters including the search string specified by the user, the current location of user device 210, and/or language preferences associated with user device 210.

In some implementations, system 200 can include server device 240. For example, server device 240 can be a computing device configured to perform location searches for various client devices, such as user device 210. The search results provided by server device 240 can be spatially relevant to the current location of user device 210 received in request 202. Server device 240 can include search module 242. Search module 242 can correspond to a software server configured to process search requests (e.g., search request 202) received from client devices, such as user device 210.

When request 202 is received by server device 240, search module 242 can search various databases (e.g., business database 244, address database 246, query database 248, etc.) for location related items that match the search string, location, and/or language specified in request 202. For example, business database 244 may include records that contain information (e.g., business name, address, phone number, etc.) about various businesses. Search module 242 can search business database 244 for business names that include a substring that matches the search string received in request 202. Address database 246 may include records that contain information (e.g., street names, building numbers, city names, etc.) about various addresses. Search module 242 can search address database 246 for street names, city names, etc., that include a substring that matches the search string received in request 202. Query database 248 may include records that contain information (e.g., popular search query strings) about various location search queries. Search module 242 can search query database 248 for location query strings that include a substring that matches the search string received in request 202. Search module 242 can combine the matching records from the various databases into a collection of search results items and send the search results items to user device 210 in reply message 204. For example, reply message 204 can include search results items corresponding to the matching business, address, and/or query records from databases 244, 246, and/or 248 and attribute data for each of the search results items, as described further below.

In some implementations, a search results item included in the client generated and/or server generated search results can include an identifier for the matching location corresponding to the search results item and attribute data associated with the matching location. For example, the identifier can correspond to the name of a business, name of a person (e.g., contact), the name of a street, city, country, etc., or the string identifying a recommended search query.

In some implementations, the search results item attributes can include additional data that may be used by a function or machine learning model to generate a score for the search results item that indicates the likelihood that the user will select the corresponding search results item. For example, the search results item attributes can include the following example attribute items:

Item type—business item, address item, suggested query item, contacts item, recent place, etc.

Source identifier—An identifier corresponding to the client-side application, database, collection, etc., that provided the search results item.

Age—The amount of time since the user expressed interest in the search results item.

Distance—The distance between the physical location of the search results item and the user device.

Location data—Data (e.g., address, coordinates, etc.) identifying the physical location of the search results item.

Fraction of match—The ratio defined by the length of the search input string over the length of the matching search results item identifier (e.g., input string length/match string length, "hot"/"hotel azure"=3/11=27%).

Server score—A numerical score assigned to the search results item by the server that indicates the server's determination of the likelihood that the user will select the corresponding search results item.

Contact relevance score—A binary (e.g., 1 or 0) score generated by the client device indicating whether the contact related search result item is relevant to the user. Relevance can be determined by existence of the search result item in the user's contacts database/application, recent interactions between the user and the contact, or other activities related to the contact.

Place importance score—A binary (e.g., 1 or 0) score generated by the client device indicating whether the place related search result item is relevant to the user. Relevance can be determined by existence of the search result item in the user's contacts database/application, recent interactions between the user and the place, or other activities related to the place.

Tourist probability—A numerical value representing the probability that the user is a tourist in the search area (e.g., where a high numerical value may indicate that the user is likely a tourist and a low numerical value may indicate that the user is likely a resident of the search area).

The above list of search results item attributes is not an exhaustive list. The attributes may include more or fewer attribute data items. The above listing is just an example of the types of data that may be collected and used to generate scores for the search results items by the user device.

In some implementations, after receiving the search results items, and corresponding attributes, from the local sources and the server device, navigation application 212 may send the search results items and attributes to ranking module 220 for ranking. For example, ranking module 220 may generate a ranking score for each search results item based on the corresponding attributes for the item. The ranking score may indicate the likelihood that the user will select the corresponding search results item.

In some implementations, ranking module 220 may be a machine learning model that is configured with features corresponding to the search results items attributes described above. The machine learning model may be trained and/or configured using behavioral data obtained by server device 240 from users of different client devices (e.g., user device 210). Based on the training data, server device 240 may generate configuration data that specifies mean, maximum, and weight values for each feature/attribute. The configuration data can be sent to user device 210 in reply 204 (or other message) so that user device 210 can use the mean and maximum values to normalize the values for each search results item attribute. The weight values can be adjusted, or tuned, by server device 240 to adjust the relative importance, or impact, of the various attributes/features on the final ranking score for each search results item.

In some implementations, ranking module 220 may be a mathematical function that generates a ranking score based on the attribute values corresponding to each search results item. For example, server device 240 may generate configuration data that specifies mean, maximum, and weight values for each feature/attribute. The configuration data can be sent to user device 210 in reply 204 (or other message) so that user device 210 can use the mean and maximum values to normalize the values for each search results item attribute. The weight values can be adjusted, or tuned, by server device 240 to adjust the relative importance, or impact, of the various attributes/features on the final ranking score for each search results item. The function may be implemented as follows:

$$P = \frac{1}{1 + e^{\sum w_i x_i}}$$

where P is the probability (e.g., ranking score) that the user will select the search results item being scored, $w_i$ represents the weight of the $i^{th}$ attribute/feature, and $x_i$ is the normalized value of the $i^{th}$ attribute/feature. Thus, the exponent for e is the sum of the weighted, normalized values for each attribute/feature of the search results item that is being scored. Of course, some implementations may use other linear or non-linear functions and/or variations of the above function to generate the ranking score for each search results item.

In some implementations, user device 210 can include personalization module 222. For example, personalization module 222 can generate a personalization score for each search results item. The personalization score can be generated based on the ranking score generated by ranking module 220 and a relevance value received from user portrait module 224. For example, user portrait module 224 can manage data that describes a user's behavior over time. User portrait module 224 can use this user behavior data to determine whether a search results item is relevant to the user at a particular time (e.g., at the current time when the search is being performed). In some implementations, personalization module 222 can send a search results item to user portrait module 224 so that user portrait module 224 can generate relevance values (e.g., relevance scores) for each search results item. In some implementations, user portrait module 224 can return a relevance value (e.g., 1, 0, −1) for the search results item indicating that the search results item is relevant (1), not relevant (−1), or that there is not enough data to determine relevance (0). In some implementations, instead of generating the three relevance values (e.g., 1, 0, −1) above, user portrait module 224 can generate a probability value (e.g., between zero and one) that indicates the likelihood that the search results item is relevant to the user based on the user's recent past behavior. These probability values can be returned to personalization module 222 as relevance values. Alternatively, these probability values can be converted or mapped to enumerated or discrete values (e.g., high, medium, low, unknown, etc.) that can be used to determine the relevance of each search results item to the user.

Personalization module 222 can apply these relevance values to a personalization weight received from server device 240 (e.g., in reply 204) to generate a promotional value that can be used to generate the personalization score. For example, the personalization score can be generated by using the following equation: personalization_score=ranking_score+ relevance_value*personalization_weight. Thus, if the search results item is relevant to the user's current context (e.g., location, time, recent interests, etc.), the personalization score can be generated by adding the personalization weight to the ranking score. If the search results item is not relevant to the user's current context (e.g., location, time, recent interests, etc.), the personalization score can be generated by subtracting the personalization weight from the ranking score. If the search results item is of unknown relevance to the user's current context (e.g., location, time, recent interests, etc.), the personalization score can be equal to the ranking score.

Figure 4:
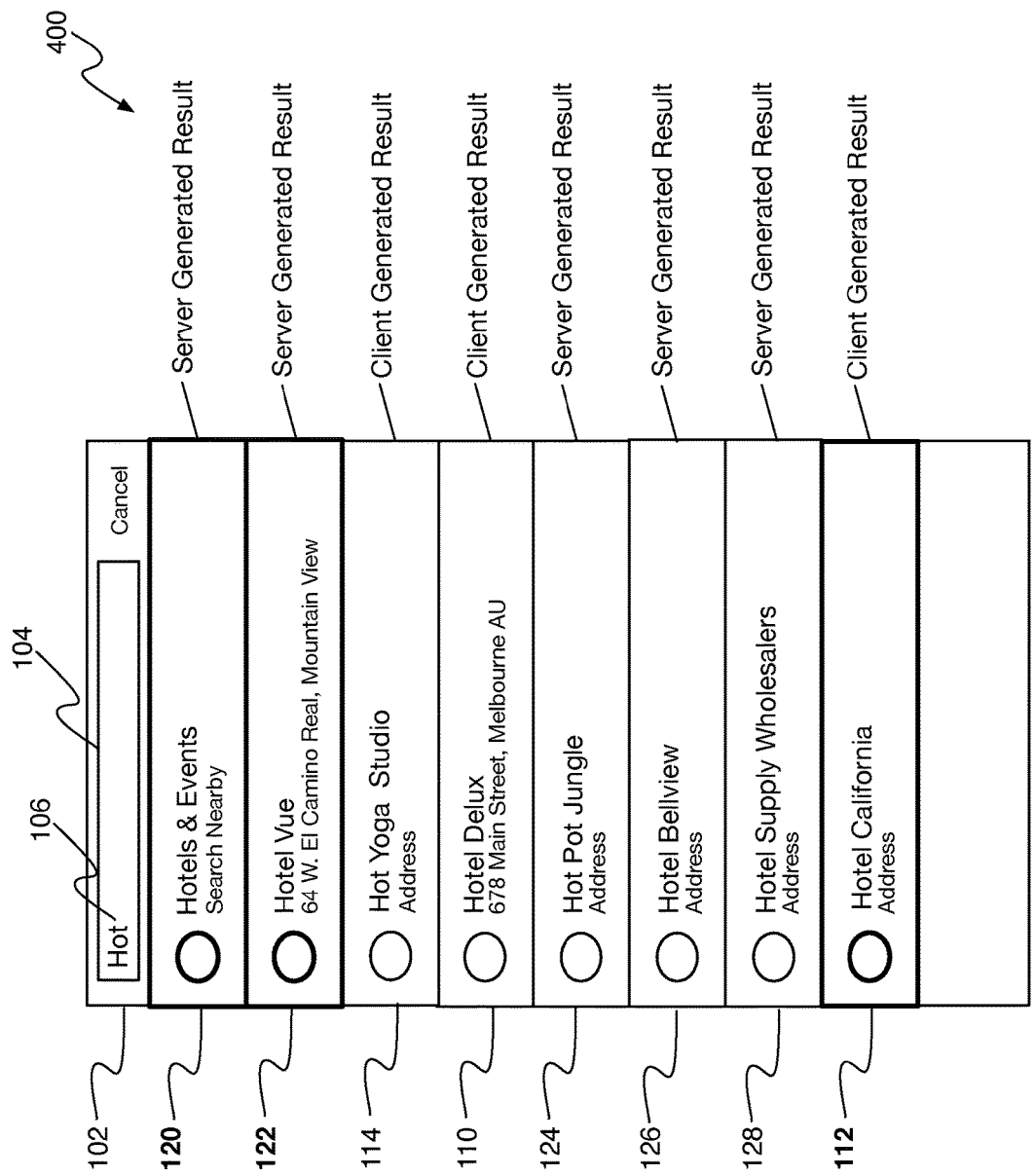
FIG. 4 is an example graphical user interface for presenting search results items according to their personalization scores.

After generating the personalization scores for each search results item, personalization module 226 can send the search results items and corresponding personalization scores to graphical user interface (GUI) module 226. For example, GUI module 226 can order, or sort, the search results items based on their corresponding personalization scores and then present the ordered, personalized, search results items on a display of user device 210, as illustrated by FIG. 4 and/or FIG. 5 below.

Figure 3:
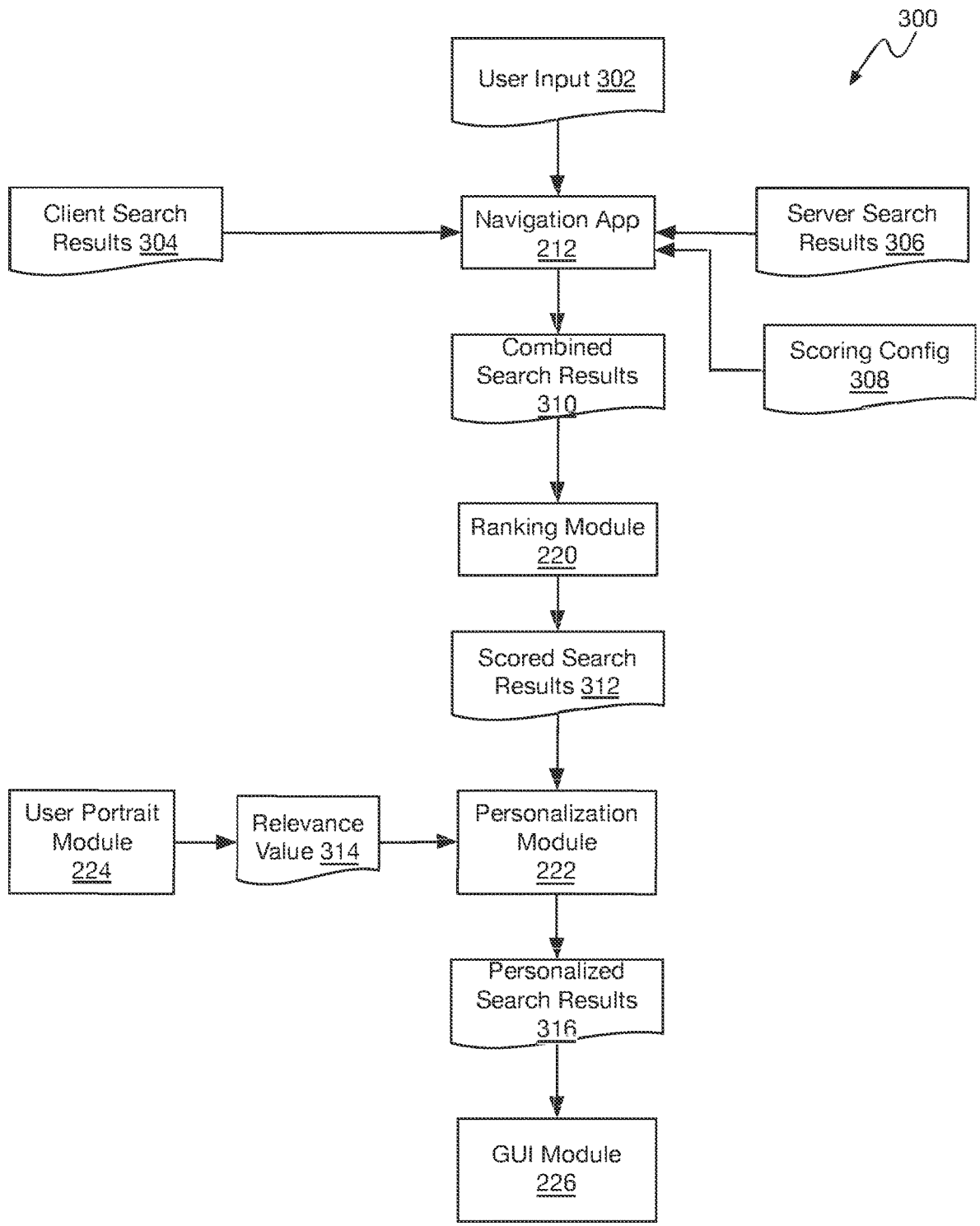
FIG. 3 is a conceptual flow diagram that illustrates the data and processes involved in client-side personalization of search results.

FIG. 3 is a conceptual flow diagram 300 that illustrates the data and processes involved in client-side personalization of search results. Diagram 300 illustrates the steps and data used by user device 210 to generate the personalization scores for each search results item and present a personalized ordering (e.g., based on relevance to the user of user device 210) of search results items on a display of user device 210.

In some implementations, navigation application 212 can receive user input 302. For example, the user input can be text input received through a keyboard or voice input, as described above. The text input can include a sequence of characters that compose an entire word, sentence, phrase, etc., or a partial word or words. The text input can be received character by character and processed (e.g., a search performed, personalized results presented, etc.) as each character is received. Thus, the text input can include the first few characters (e.g., a prefix) of a word, sentence, phrase, search parameter, etc.

Upon receiving user input 302, navigation application 212 can search local sources on user device 210 to obtain client search results 304 and can obtain server search results 306 from server device 240, as described above. Client search results 304 and server search results 306 can include search results items that match user input 302 and can include corresponding search results item attributes for each search results item. After obtaining client search results 304 and server search results 306, navigation application 212 can combine the client and server search results into combined search results 310.

In some implementations, navigation application 212 may receive scoring configuration data 308 from server device 240. The scoring configuration data 308 can include values for configuring ranking module 220 (e.g., to configure a machine learning module or scoring function used by ranking module 220) to generate ranking scores for each search result item. The scoring configuration data 308 can include for each search result item attribute (or feature used for generating a ranking score) a mean value, a maximum value, and a weight value, as described above. The mean value and maximum value for a particular attribute can be used by ranking module 220 to generate a normalized value for the particular attribute. The weight value for the particular attribute can be used to indicate or adjust the influence that the particular attribute has on the ranking score generated for the corresponding search results item. The weights across multiple different attributes can vary according to the importance of the attribute to predicting whether a user will select a particular search results item. Scoring configuration data 308 may include a personalization weight value to be used for generating the personalization scores for each search results item, as described above and further below.

In some implementations, search results items can be ranked by ranking module 220. For example, the search results items in combined search results 310 can be scored by ranking module 220 so that the search results items can be sorted, or ordered, according to their ranking scores. Ranking module 220 can use a machine learning model configured to score search results items based on the various features (e.g., search results item attributes) described above. For example, ranking module 220 can normalize the values associated with each search results item attribute using the mean and maximum values received for each attribute/feature in scoring configuration data 308 and generate scores based on the normalized values. Alternatively, ranking module 220 can use a mathematical function to score each search results item based on the normalized values of the attributes received for the search results item and the weights assigned to the various attributes, as defined in scoring configuration data 308. Thus, ranking module 220 can generate scored search results 312 that includes the combined search results items and their corresponding ranking scores.

In some implementations, personalization module 222 can generate personalization scores for each of the combined search results items based on the relevance of each search results item to the user of user device 210. For example, personalization module 222 can receive scored search results 312. Personalization module 222 can send each search results item in scored search results 312 to user portrait module 224. User portrait module 224 can determine whether each search results item is relevant to the user's recent behavior or context. For example, user portrait module 224 can monitor the user's interactions with user device 210 (e.g., location search queries, internet browser search queries, messages exchanges, etc.) and/or recent locations visited by user device 210 to determine the user's current and/or recent (e.g., last 6 weeks, last 2 months, etc.) behavior or context. User portrait module 224 can compare the received search results items, including various attributes, to determine whether each search results item is relevant to the user. If user portrait module 224 determines that the search results item is relevant, user portrait module 224 can return relevance value 314 having a value of one (1). If user portrait module 224 determines that the search results item is not relevant, user portrait module 224 can return relevance value 314 having a value of negative one (−1). If user portrait module 224 does not have enough information to determine relevance for the search results item, user portrait module 224 can return relevance value 314 having a value of zero (0). Personalization module 222 can receive relevance value 314 for each of the search results items and multiply relevance value 314 by the personalization weight to generate an adjustment value for the ranking score for the corresponding search results item. Personalization module 222 can then add the adjustment value generated for each search results item to the corresponding ranking score for the corresponding search results item to generate the personalization score for each of the search results items. The search results items and corresponding personalization scores can then be sent to GUI module 226 as personalized search results 316.

In some implementations, GUI module 226 can generate a graphical user interface that presents search results items ordered, or sorted, based on the personalization scores generated for each search results item. For example, GUI module 226 can receive personalized search results 316 from personalization module 222. GUI module 226 can sort or order the search results items (e.g., client search results and server search results) according to their respective personalization scores. GUI module 226 can then present the ordered search results on a display of user device 210. For example, GUI module 226 can present the ordered search results by generating and presenting the graphical user interfaces illustrated in FIG. 4 and/or FIG. 5.

FIG. 4 is an example graphical user interface 400 for presenting search results items according to their personalization scores. For example, GUI 400 can be generated by GUI module 226 and presented on a display of user device 210. GUI 400 can be similar to GUI 100, described above. However, rather than presenting client (e.g., user device 210) generated results at the most prominent location (e.g., top of the search results listing) on GUI 100 and server generated results at less prominent locations (e.g., after the server generated search results), the client and server search results can be ordered according to the personalization score generated for each search results item. For example, in contrast to GUI 100 where client results 110-114 are presented at the top of the search results listing followed by server results 120-128 at the bottom of the search listing, GUI module 226 can generate GUI 400 that presents the search results items 110-128 according to the personalization scores generated for each of the search results items. Thus, the personalization scores may cause GUI module 226 to present server generated search results items 120 and 122 above client search results items 114, 110 or cause the client search results items and server search results items to be interleaved, as illustrated by GUI 400.

Figure 5:
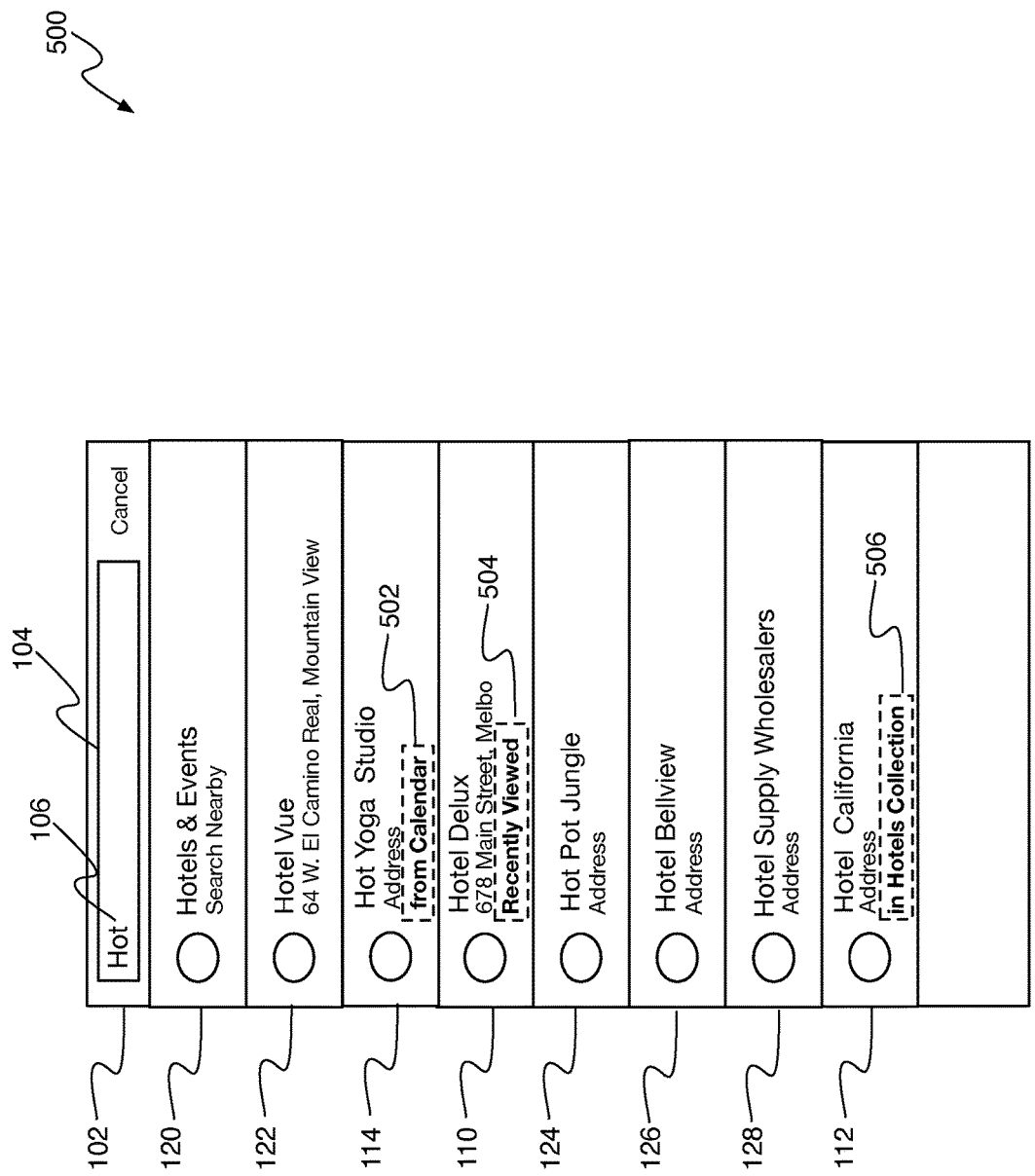
FIG. 5 is an example graphical user interface for presenting search results items that identifies the source of the search results items.

FIG. 5 is an example graphical user interface 500 for presenting search results items that identifies the source of the search results items. For example, GUI 500 can be generated by GUI module 226 and presented on a display of user device 210. GUI 500 may be similar to GUI 100 and/or GUI 400 described above. GUI 500 may present search results items that match the user input received in text box 106.

In addition to the name (e.g., identifier, label, etc.) of the search results item and/or address, search results items presented on GUI 500 may include a description of the source of the search results item. For example, when the search results item was obtained from a local source (e.g., application, database, collection, etc.) on user device 210, GUI 500 can present an identifier, label, or other indication of the source of the search result item. Since the source identifier is included in the attribute data for the search results item, GUI module 226 can use the source identifier attribute to generate a label that can be presented in locally sourced (e.g., sourced from user device 210) search results items on GUI 500. For example, search result item 114 may have been sourced from a calendar application on user device 210. Thus, GUI 500 can present source label 502 (e.g., "from Calendar") within the listing for search results item 114. Similarly, search result item 110 may have been sourced from a collection of recently viewed locations stored on user device 210. Thus, GUI 500 can present source label 504 (e.g., "Recently Viewed") within the listing for search results item 114. Search result item 112 may have been sourced from a user curated collection of hotels stored on user device 210. Thus, GUI 500 can present source label 506 (e.g., "in Hotels Collection") within the listing for search results item 112. Of course, other sources and labels may be presented within search results items, such as those associated with restaurant reservation applications, business review applications, note taking applications, photos applications, contacts applications, messaging applications, or other applications that may include location data.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. For example, steps of processes 600 and 700 described below may be combined to produce processes that present personalized search results and also present information describing the sources from which individual search results items were obtained. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 6:
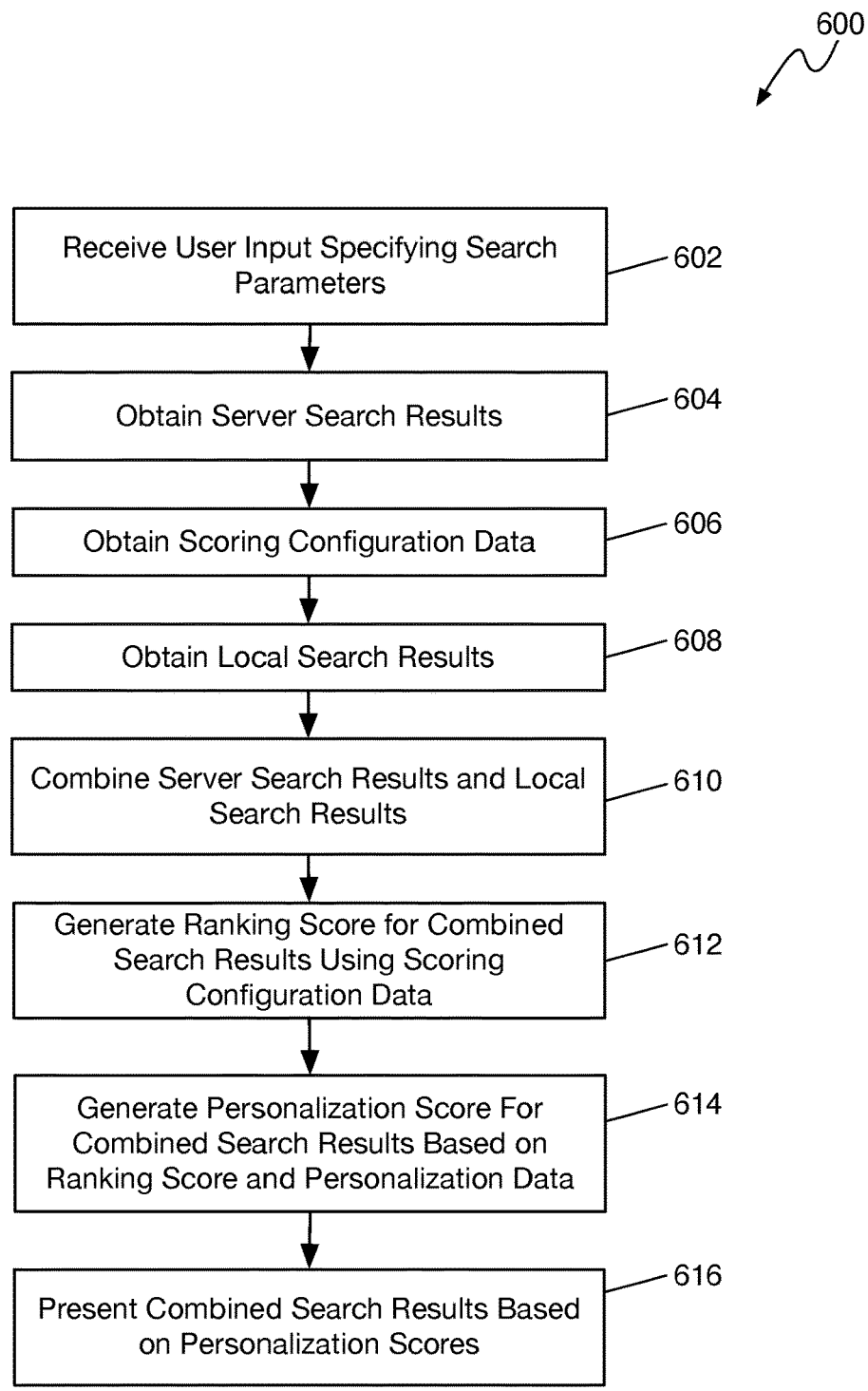
FIG. 6 is flow diagram of an example process for client-side personalization of search results.

FIG. 6 is flow diagram of an example process 600 for client-side personalization of search results. For example, process 600 can be performed by user device 210 to present search results on a display of user device 210 according to user relevance.

At step 602, user device 210 can receive user input specifying search parameters. For example, user device 210 can receive text input (e.g., through keyboard input, voice input, etc.) that specifies one or more characters, words, etc., as search parameters for performing a location search.

At step 604, user device 210 can obtain server search results. For example, user device 210 can send a search request to a remote server. The search request 202 can include the text input, the current location of user device 210, and/or language preferences associated with user device 210. The server can perform a search for locations matching the data in search request and return the matching search results items to user device 210 in reply message 204. The reply message can include the search results items and item attributes).

At step 606, user device 210 can obtain scoring configuration data. For example, user device 210 can obtain scoring configuration data from the server in reply message 204 or some other message. The scoring configuration data can specify mean and maximum values for each search results item attribute/feature to be used by user device 210 to normalize the corresponding attribute values. The scoring configuration data can specify weight values to apply to each normalized attribute value. The scoring configuration data can specify a personalization weight to be used when generating the personalization scores for each search results item.

At step 608, user device 210 can obtain local search results from sources on user device 210. For example, the local sources can include various applications (e.g., calendar application, photos application, notes application, messaging applications, etc.) on user device 210, automatically generated collections (e.g., recently viewed locations, recently visited locations, etc.), user curated collections (e.g., favorite restaurants, favorite hotels, etc.), or any other data source that may store location data for locations that may be relevant to the user.

At step 610, user device 210 can combine the server search results with the client search results. For example, user device 210 can combine the server search results with the client search results to generate combined search results.

At step 612, user device 210 can generate a ranking score for each of the search results in the combined search results using the scoring configuration data. For example, user device 210 can normalize the attribute values for each attribute of a search results item based on the mean value and the maximum value specified for the corresponding attribute. The attribute weight value specified in the scoring configuration data can then be used to adjust the impact that each attribute value has on the resulting ranking score. The scoring can be implemented as a machine learning model or as a function, as described above.

At step 614, user device 210 can generate a personalization score for each search results item. For example, user device 210 can apply the personalization weight to the ranking score for each search results item to promote or demote each search results item. To do so, the personalization weight can be multiplied by a relevance value (e.g., 1, 0, −1) before adding the product to the ranking score of a search results item. For example, the personalization score can be calculated by: personalization_score=ranking_score+relevance_value*personalization weight. Thus, if the search results item is relevant to the user's current context (e.g., location, time, recent interests, etc.), the personalization score can be generated by adding the personalization weight to the ranking score. If the search results item is not relevant to the user's current context (e.g., location, time, recent interests, etc.), the personalization score can be generated by subtracting the personalization weight from the ranking score. If the search results item is of unknown relevance to the user's current context (e.g., location, time, recent interests, etc.), the personalization score can be equal to the ranking score.

At step 616, user device 210 can present the combined search results based on the personalization scores. For example, user device 210 can sort, or order, the combined client/server search results based on the personalization score generated for each search results item and present the ordered search results item on a display of user device 210, as illustrated by FIG. 4 and/or FIG. 5.

Figure 7:
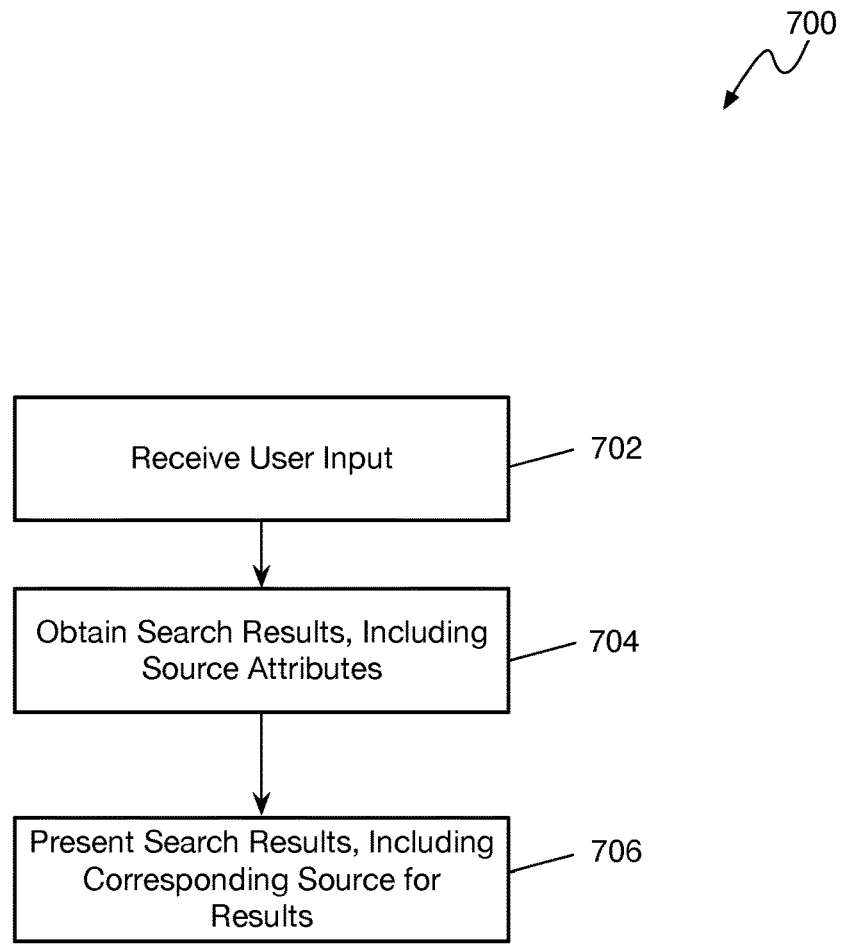
FIG. 7 is a flow diagram of an example process for presenting search results including source descriptions.

FIG. 7 is a flow diagram of an example process 700 for presenting search results including source descriptions. For example, process 700 can be performed by user device 210 present search results and identify a source from which the search results were obtained.

At step 702, user device 210 can receive user input specifying search parameters. For example, user device 210 can receive text input (e.g., through keyboard input, voice input, etc.) that specifies one or more characters, words, etc., as search parameters for performing a location search.

At step 704, user device 210 can obtain search results. For example, the search results can include source attributes for the search results items. For example, user device 210 can obtain search results (e.g., locations, business names, addresses, recommended search queries, contacts names, etc.) matching the search parameters from local sources on user device 210 and/or from a remote server device 240. The search results items can include various attributes for each search results item. One of these attributes can include an identification of a source (e.g., an application, a database, an automatically generated collection, a user curated collection, etc.) where the search result item was obtained.

At step 706, user device 210 can present the search results. For example, user device 210 can generate a graphical user interface (e.g. GUI 500) that presents the search results items (e.g., a listing of search results items). The listing for each search results item can include, for example, a location identifier (e.g., the name of the corresponding business, street, person, etc.), an address, and/or a description of the source from which the corresponding search results item was obtained.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to present personalized search results. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present personalized search results that are relevant to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of personalized presentation of search results, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, search results can be presented based on non-personal information data or a bare minimum amount of personal information, such as the content being requested by the device associated with a user, other non-personal information available to the search services, or publicly available information.

Example System Architecture

Figure 8:
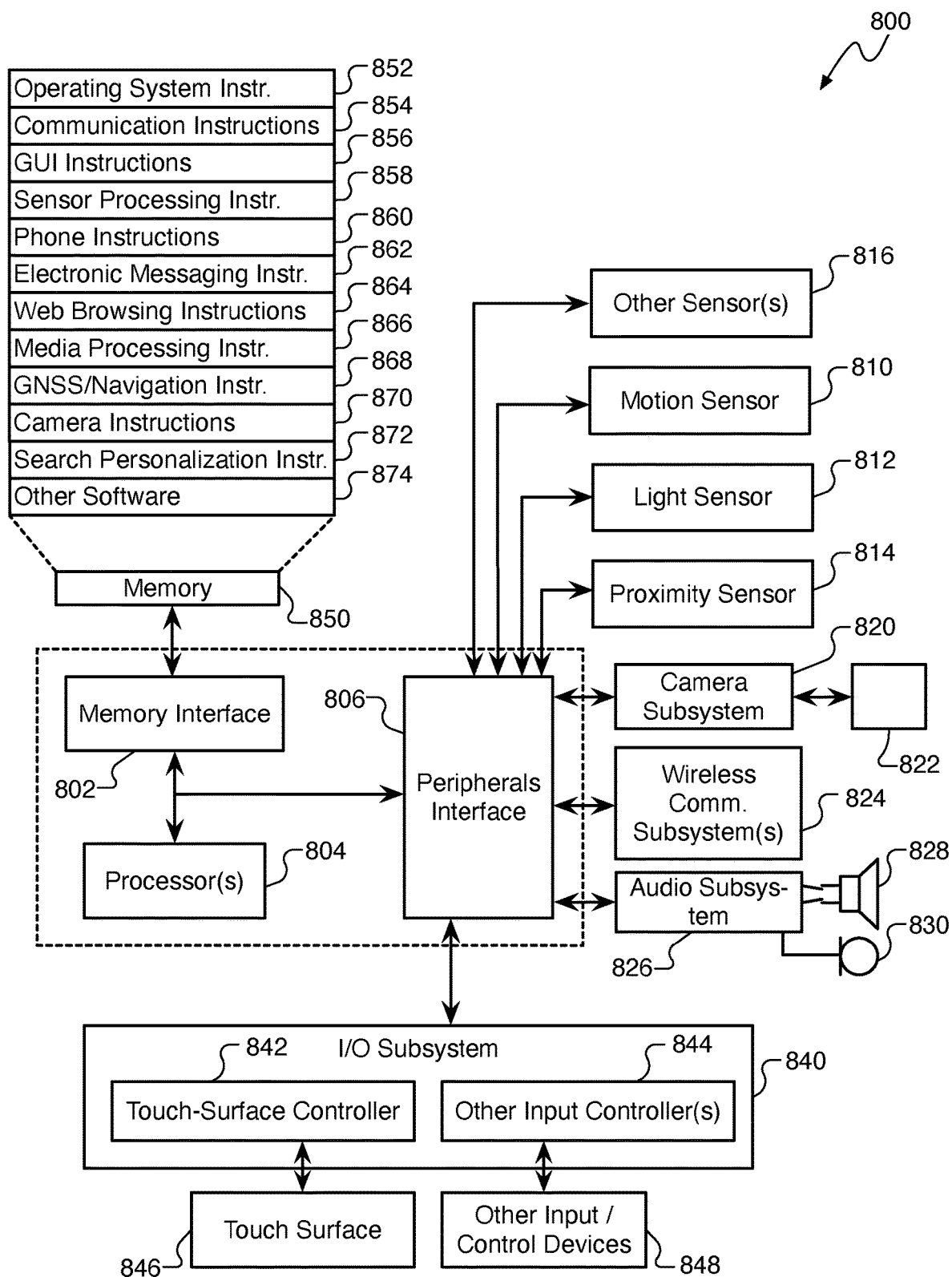
FIG. 8 is a block diagram of an example computing device 800 that can implement the features and processes of FIGS. 1-7.

FIG. 8 is a block diagram of an example computing device 800 that can implement the features and processes of FIGS. 1-7. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the device 100 can be configured as a base station for other wireless devices.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voiceprinting and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™

The memory interface 802 can be coupled to memory 850. The memory 850 can include high-speed random-access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing client-side personalization of search results. For example, operating system 852 can implement the search results personalization features as described with reference to FIGS. 1-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store software instructions 872 to facilitate other processes and functions, such as the search results personalization processes and functions as described with reference to FIGS. 1-7.

The memory 850 can also store other software instructions 874, such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
obtaining, by a user computing device, a set of search results items, the set of search results items comprising a first subset of search results items obtained by the user computing device from a server;
determining, by the user computing device, a relevance value for each of the set of search results items, each relevance value being determined based on information associated with user behavior;
generating, by the user computing device, a personalization score for each particular search results item of the set of search results items based on a corresponding relevance value for the particular search results item;
modifying, by the user computing device, the set of search results items to generate a personalized set of search results items at least by:
promoting a first search results item within the set of search results items based on the personalization score for the first search results item; and
presenting, by the user computing device, the personalized set of search results items.

2. The method of claim 1, wherein each of the set of search results items includes a plurality of attributes, wherein the plurality of attributes include a source attribute that identifies a source where a corresponding search results item was obtained, and wherein the method further comprises:
presenting, by the user computing device, a description of a particular source of a particular one of the presented search results items.

3. The method of claim 2, wherein the description of the particular source identifies an application installed on the user computing device, a database stored on the user computing device, a user curated collection of locations stored on the user computing device, or an automatically generated collection of locations stored on the user computing device, and wherein the application is a calendar application, a messaging application, a notes taking application, a photos application, or a business review application.

4. The method of claim 1, wherein each of the set of search results items includes a plurality of attributes, and wherein the plurality of attributes include an age attribute having a value corresponding to an amount of time since the user last expressed interest in a location associated with a corresponding search results item.

5. The method of claim 1, wherein the personalization score for the first search results item indicates a likelihood that the user will select the first search results item when presented to the user.

6. The method of claim 1, wherein the personalization score for the first search results item comprises the corresponding relevance value adjusted by a weight value for the first search results item.

7. The method of claim 1, further comprising:
ordering the set of search results items based on the personalization scores generated for each of the set of search results items to display search results items determined to be more relevant to recent user behavior before search results items determined to be less relevant to recent user behavior.

8. A non-transitory computer readable medium including one or more sequences of instructions that, when executed by one or more processors, cause the processors to perform operations comprising:
obtaining, by a user computing device, a set of search results items, the set of search results items comprising a first subset of search results items obtained by the user computing device from a server;
determining, by the user computing device, a relevance value for each of the set of search results items, each relevance value being determined based on information associated with user behavior;
generating, by the computing device, a personalization score for each particular search results item of the set of search results items based on a corresponding relevance value for the particular search results item;
modifying, by the user computing device, the set of search results items to generate a personalized set of search results items at least by:
promoting a first search results item within the set of search results items based on the personalization score for the first search results item; and
presenting, by the user computing device, the personalized set of search results items.

9. The non-transitory computer readable medium of claim 8, wherein each of the set of search results items includes a plurality of attributes, wherein the plurality of attributes include a source attribute that identifies a source where a corresponding search results item was obtained, and wherein the instructions cause:
presenting, by the user computing device, a description of a particular source of a particular one of the presented search results items.

10. The non-transitory computer readable medium of claim 9, wherein the description of the particular source identifies an application installed on the user computing device, a database stored on the user computing device, a user curated collection of locations stored on the user computing device, or an automatically generated collection of locations stored on the user computing device, and wherein the application is a calendar application, a messaging application, a notes taking application, a photos application, or a business review application.

11. The non-transitory computer readable medium of claim 8, wherein each of the set of search results items includes a plurality of attributes, and wherein the plurality of attributes include an age attribute having a value corresponding to an amount of time since the user last expressed interest in a location associated with a corresponding search results item.

12. The non-transitory computer readable medium of claim 8, wherein the personalization score for the first search results item indicates a likelihood that the user will select the first search results item when presented to the user.

13. The non-transitory computer readable medium of claim 8, wherein the personalization score for the first search results item comprises the corresponding relevance value adjusted by a weight value for the first search results item.

14. The non-transitory computer readable medium of claim 8, wherein the instructions cause:
ordering the set of search results items based on the personalization scores generated for each of the set of search results items to display search results items determined to be more relevant to recent user behavior before search results items determined to be less relevant to recent user behavior.

15. A system comprising:
one or more processors; and
a non-transitory computer readable medium including one or more sequences of instructions that, when executed by the one or more processors, cause the processors to perform operations comprising:
- obtaining, by a user computing device, a set of search results items, the set of search results items comprising a first subset of search results items obtained by the user computing device from a server;
- determining, by the user computing device, a relevance value for each of the set of search results items, each relevance value being determined based on information associated with user behavior;
- generating, by the computing device, a personalization score for each particular search results item of the set of search results items based on a corresponding relevance value for the particular search results item;
- modifying, by the user computing device, the set of search results items to generate a personalized set of search results items at least by:
  - promoting a first search results item within the set of search results items based on the personalization score for the first search results item; and
- presenting, by the user computing device, the personalized set of search results items.

16. The system of claim 15, wherein each of the set of search results items includes a plurality of attributes, wherein the plurality of attributes include a source attribute that identifies a source where a corresponding search results item was obtained, and wherein the instructions cause:
- presenting, by the user computing device, a description of a particular source of a particular one of the presented search results items.

17. The system of claim 16, wherein the description of the particular source identifies an application installed on the user computing device, a database stored on the user computing device, a user curated collection of locations stored on the user computing device, or an automatically generated collection of locations stored on the user computing device, and wherein the application is a calendar application, a messaging application, a notes taking application, a photos application, or a business review application.

18. The system of claim 15, wherein each of the set of search results items includes a plurality of attributes, and wherein the plurality of attributes include an age attribute having a value corresponding to an amount of time since the user last expressed interest in a location associated with a corresponding search results item.

19. The system of claim 15, wherein the personalization score for the first search results item indicates a likelihood that the user will select the first search results item when presented to the user.

20. The system of claim 15, wherein the particular personalization score for the first search results item comprises the corresponding relevance value adjusted by a weight value for the first search results item.

21. The system of claim 15, wherein the instructions cause:
- ordering the set of search results items based on the personalization scores generated for each of the set of search results items to display search results items determined to be more relevant to recent user behavior before search results items determined to be less relevant to recent user behavior.

* * * * *